Oct. 12, 1943.  P. R. SCHROEPPEL  2,331,863
TRACTOR MOWER
Filed June 27, 1942  4 Sheets-Sheet 2
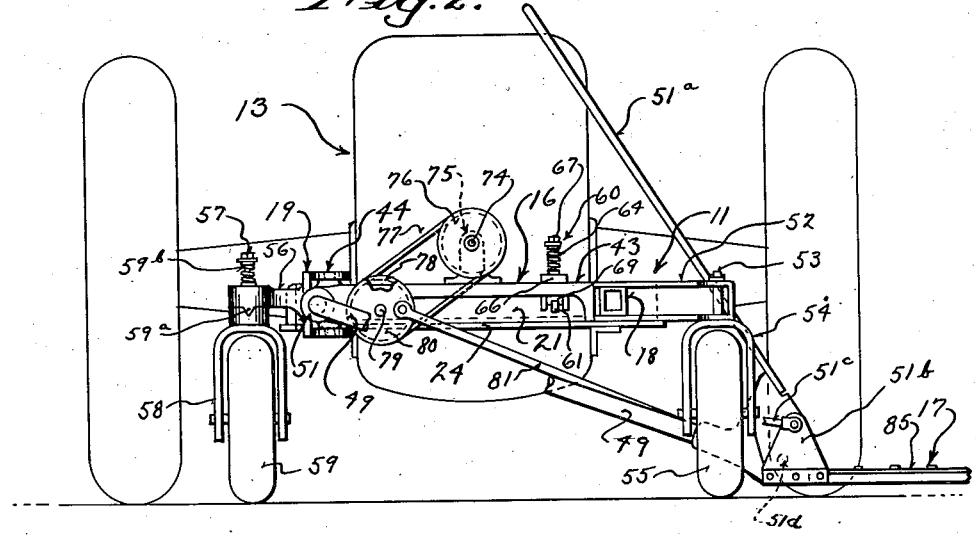
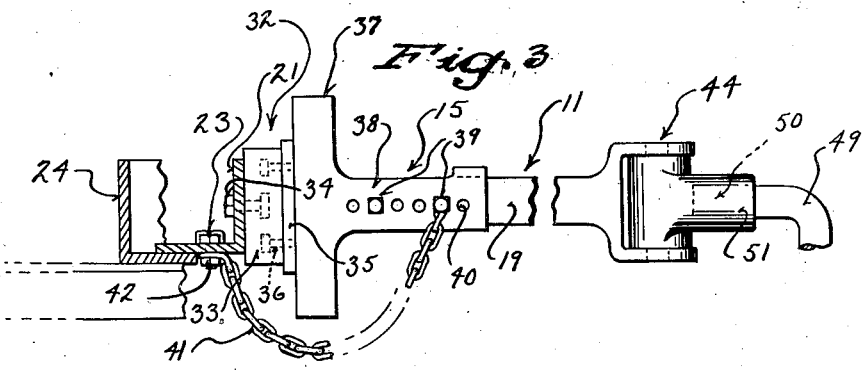
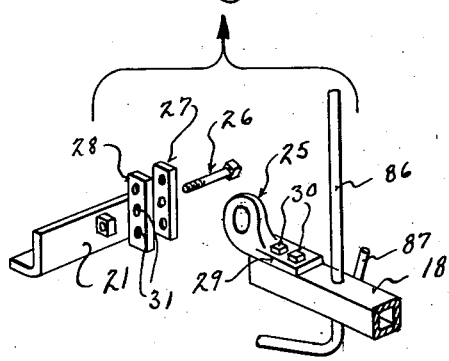
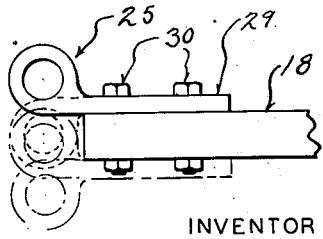
INVENTOR
Paul R Schroeppel
BY
Emerson B Donnell
ATTORNEY

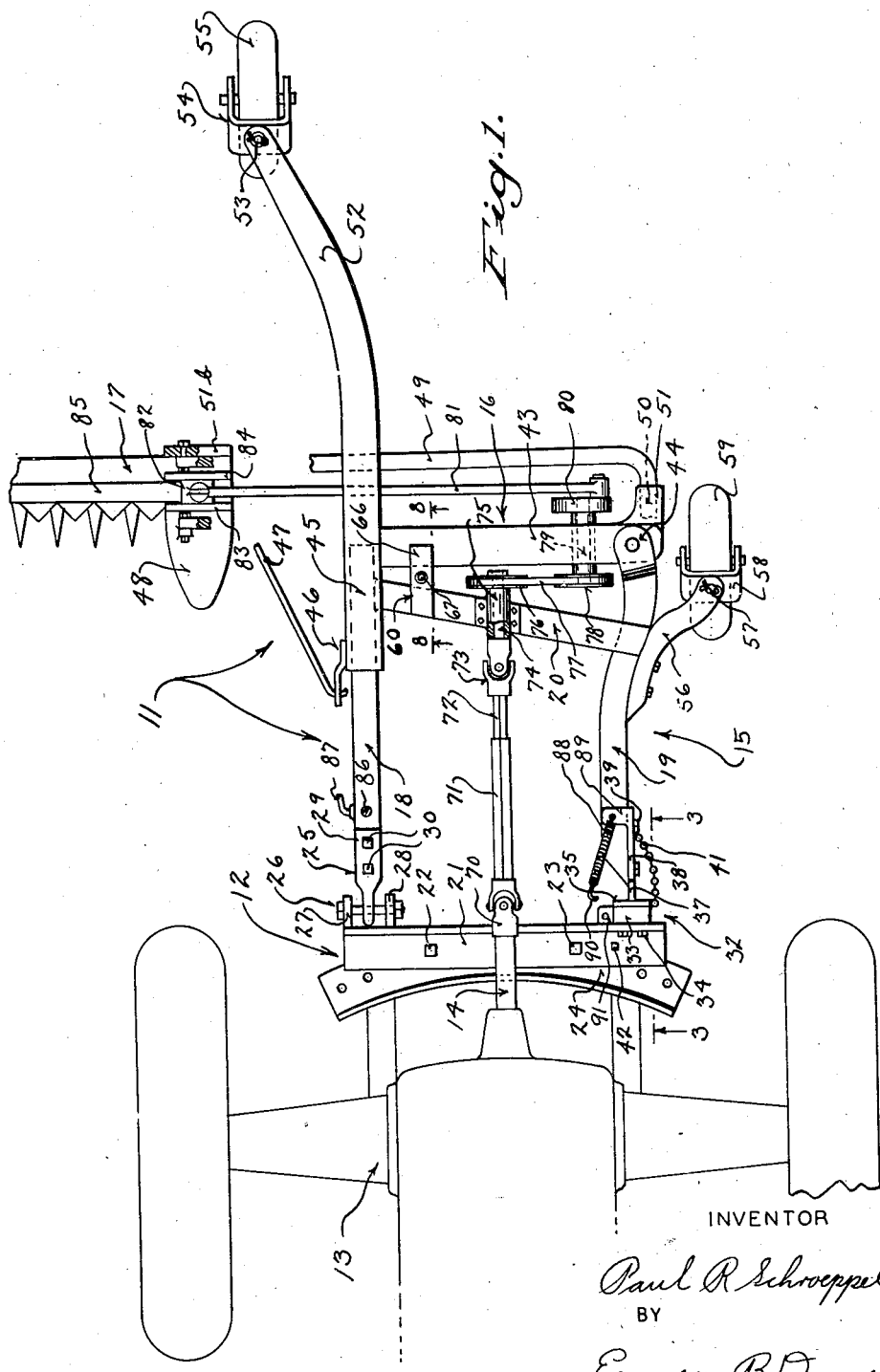

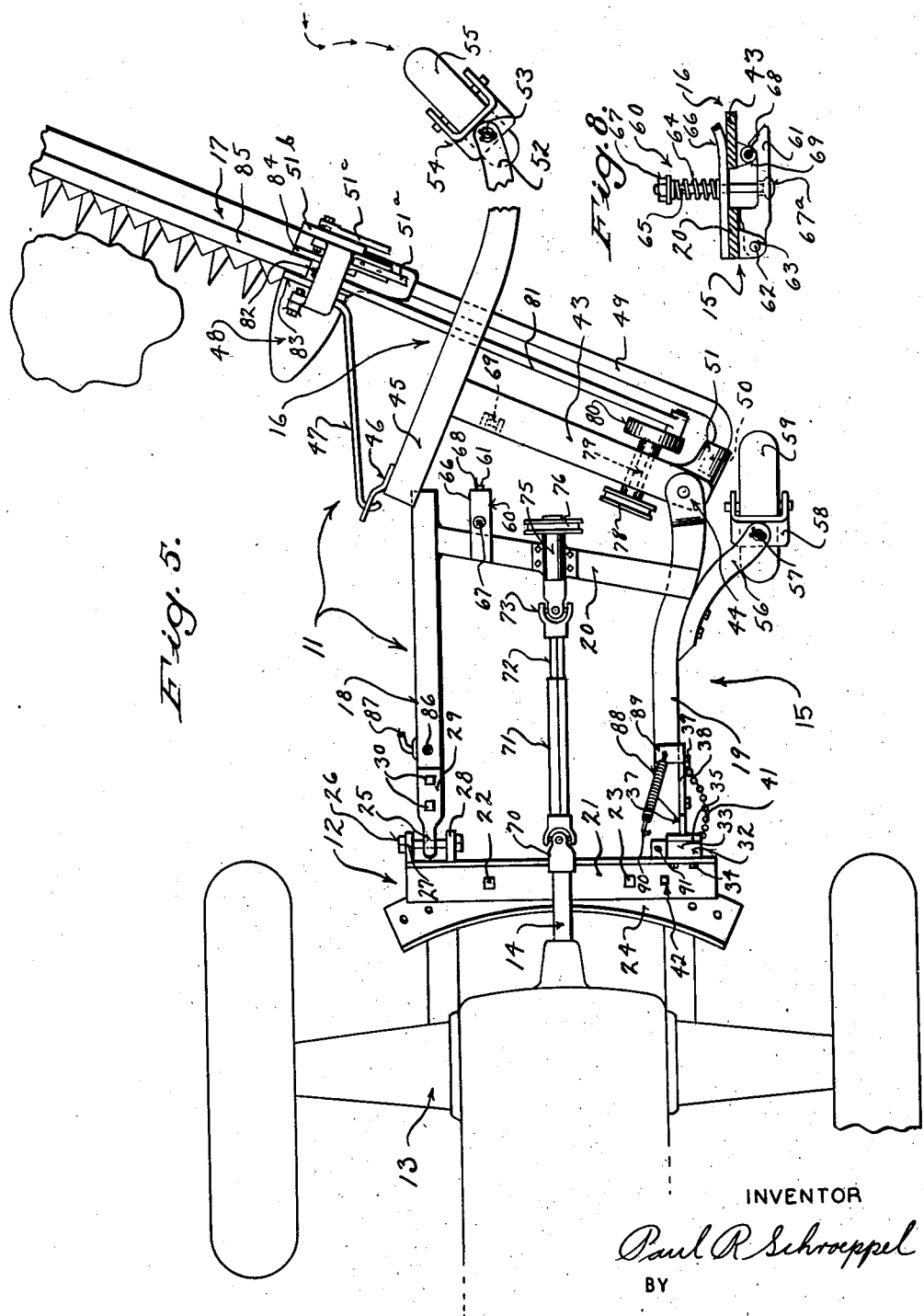

Patented Oct. 12, 1943

2,331,863

UNITED STATES PATENT OFFICE 2,331,863

TRACTOR MOWER

Paul R. Schroeppel, Rockford, Ill., assignor to J. I. Case Company, Racine, Wis., a corporation Application June 27, 1942, Serial No. 448,805

13 Claims. (Cl. 56—25)

The present invention relates to mowers and particularly to such as are operated by tractors and an object of the invention is to generally improve the construction and operation of devices of this class. A further object is to devise a mower which can be applied to and removed from a tractor with a minimum of effort.

Further objects are to provide such a mower which will follow ground contours accurately, which will have a beneficial action when negotiating turns and which will have provision for a safety release if the mower encounters obstructions.

A further object is to provide a mower which will be universally adaptable to any tractor.

Further objects and advantages will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention as herein expressed.

In the drawings, Figure 1 is a plan view of a mower with parts removed, illustrative of the invention applied to a tractor.

Fig. 2 is a rear elevation of the same construction.

Fig. 3 is an enlarged vertical sectional view taken on the line 3—3 of Fig. 1.

Fig. 5 is a view similar to Fig. 1 with the parts in released position after encountering an obstruction.

Fig. 6 is an enlarged perspective view of certain mechanism indicated in Figs. 1, 3 and 4.

Fig. 7 is a left side elevation of certain parts indicated in Fig. 6.

Fig. 8 is a sectional view taken on the line 8—8 of Fig. 1.

Figure 4:
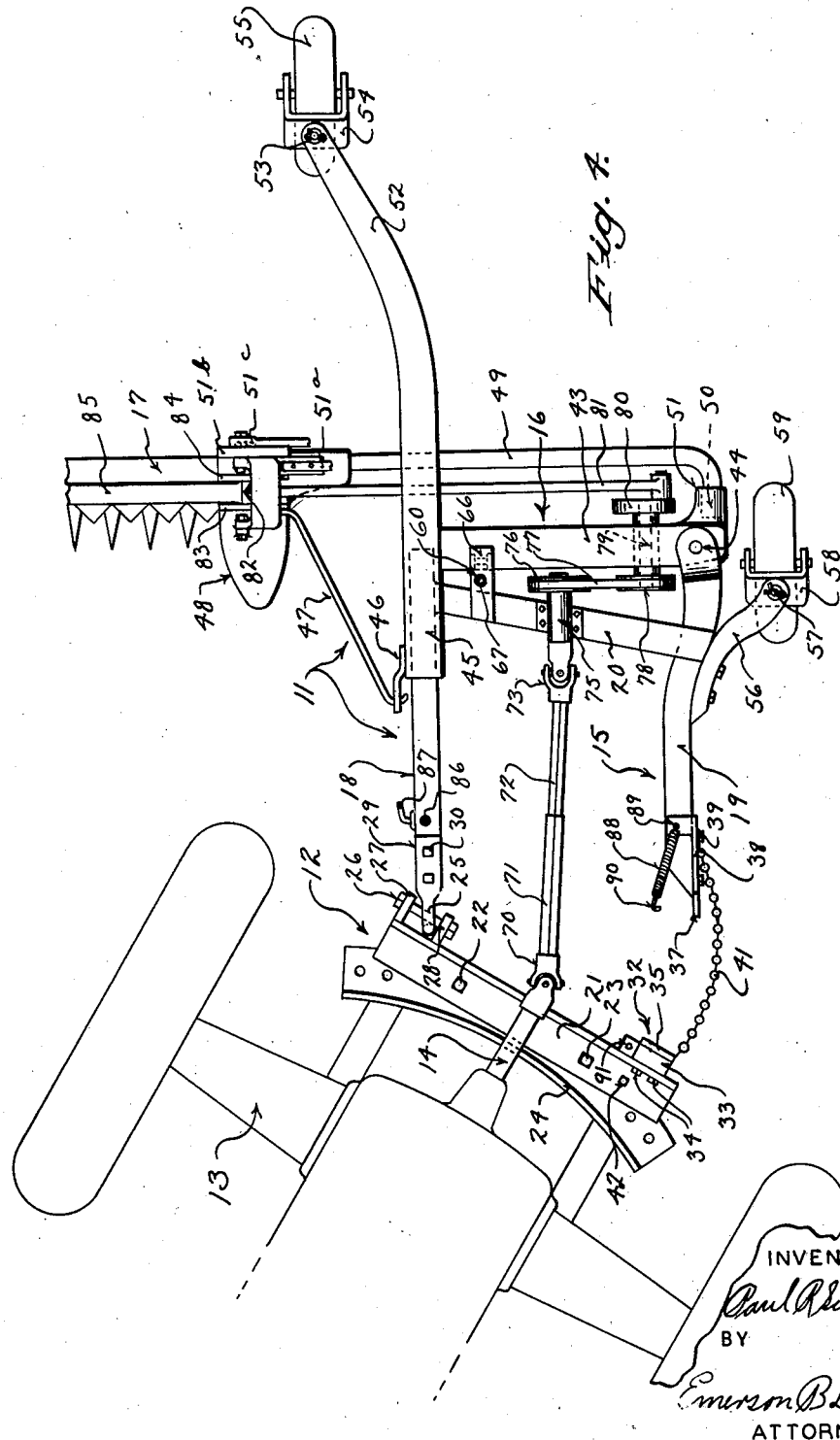
Fig. 4 is a view similar to Fig. 1 showing the combination in the act of negotiating a turn.

As seen in Fig. 1, the machine comprises a frame unit generally designated as 11 which is connected at 12 to a tractor generally designated as 13 which since it forms no part of the present invention need not be further described except to say that it has the usual power take-off shaft 14 extending from the rear thereof. Frame 11 is made up of a front section generally designated as 15 and a rear section 16, a cutter bar 17 of any suitable or the usual type being carried by the frame section 16. The mower is accordingly drawn behind the tractor 13 and actuated thereby as will appear.

Returning to frame section 15, this member is constituted by fore-and-aft extending portions 18 and 19 united by a cross member 20. It is to be understood that these members may be of any of the usual metallic or other shapes within the contemplation of the invention. A supporting bar or member 21 is suitably fixed with tractor 13 in the present instance by means of bolts 22 and 23 engaging a quadrant 24 carried at the rear of tractor 13 for well-known purposes. Member 21 constitutes the connecting means between the tractor and the mower and may be fastened to any convenient part of the tractor structure. Member 18 is connected for universal movement with member 21, in the present instance having a tongue 25 engaged with a bolt 26 traversing ears 27 and 28 fixed with member 21. This provides for up-and-down swinging of member 18 about bolt 26 and in the present instance sufficient freedom is allowed about bolt 26 to provide for substantial misalignment or swinging of member 18 in any direction.

Tongue 25 as more particularly shown in Fig. 6, in the present instance has a shank portion 29 fixed to member 18 as by bolts 30—30, while ears 27 and 28 extend up-and-down for a substantial distance and are provided with a plurality of holes 31—31 for accommodation of bolt 26. As seen in Fig. 7, tongue 25 may be assembled with member 18 in a plurality of positions as indicated in dotted lines so as to give various heights to member 18. Thus it can be turned over from the position shown, it can be applied below instead of above member 18 and when so assembled, tongue portion 25 may extend above or below portion 29 as necessary to obtain the required adjustment. Vertical adjustment of member 18 may thus be had in relatively small increments.

It should be noted that in one sense tongue 25 constitutes the sole connection between mower 11 and tractor 13 so that exceptional freedom of action is permitted in the two connected units.

Member 19, Fig. 1, is maintained in fixed relation to member 18 by member 20 and in fact in operation these members together with the entire rear frame section 16 constitute a unitary rigid frame unit. Member 20 is united with members 18 and 19 in any suitable manner as by welding, rivets, bolts or the like.

As will now be apparent, the rearward reaction of the crop against cutter bar 17 will tend to swing the whole assembly in a substantially horizontal plane about bolt 26 as a fulcrum, tending to cause forward movement of member 19 relatively to bar 21. To resist this, abutment means generally designated as 32 is provided on member 21. Various constructions are contemplated but in the present instance a block of resilient compressible material, such for example as rubber 33, Fig. 3, is fixed in any suitable manner as by bolts 34 with member 21. Block 33 is faced with a plate 35 fixed to block 33 by screws or the like 36. A cushioned abutment is thereby provided but faced with a durable material such as metal in the form of plate 35. Member 19 has a T head 37 in the present instance provided with a shank 38 fixed to member 19 as by bolts 39—39. Extra holes 40 are provided in shank 38 so that the relative position of head 37 and member 19 may be adjusted.

It will now be apparent that the above mentioned rearward reaction against cutter bar 17 will maintain T head 37 in contact with abutment 32. Also, head 37 may slide or be shifted up-and-down relatively to abutment 32 as induced by rocking movement of either the tractor or mower unit.

It is to be noted that the adjustment provided in holes 40 will affect the working position of the mower, and this adjustment may be used to locate the cutter bar at right angles to or in other desired relation to the direction of travel. If wear takes place, allowing the cutter bar to lag behind the desired position, this adjustment can be used to correct this condition.

To prevent accidental displacement of T head 37 and for other purposes, a chain or other auxiliary connection 41 is extended between members 19 and 21. In the present instance chain 41 is given sufficient slack to provide for substantial displacement of T head 37. Chain 41 may be fastened in any suitable or desired manner, in the present instance engaged with one of bolts 39 and also with a bolt 42 on member 21.

Rear frame section 16, Fig. 1, comprises a cross member 43 hinged at 44 to above mentioned member 19 for swinging in a substantially horizontal plane. Member 43 extends beneath member 18 and has a forward extension 45 carrying an ear 46 to which is pivotally attached a brace 47. Extension 45 is preferably hollow, for example of inwardly open channel section, and receives within itself the rear extremity of portion 18. This provides substantially rigid alignment of portions 18 and 45 when the parts are in the position shown.

Brace 47 extends to an inner shoe 48 of well-known type on above mentioned cutter bar 17. A push bar 49 extends transversely of the machine from shoe 48 and has a forwardly extending journal portion 50 engaged in a bearing 51 constituting a part of member 43. Through these members inner shoe 48 and accordingly cutter bar 17 are propelled by forward motion of frame unit 11 in well-known manner. Insofar as cutter bar 17 is concerned, well-known expedients for raising and lowering push bar 49, inner shoe 48 and cutter bar 17 are provided. These are not illustrated or described in detail, since they form no part of the present invention, except to say that a lever 51ª, Fig. 2, is connected to shoe structure 48 and extended to a point within reach of the operator on tractor 13 for tilting cutter bar 17, suitable means not shown being provided for maintaining the adjustment. Cutter bar 17 also has an upright bracket or lever arm 51ᵇ with which is connected a link 51ᶜ leading to a well-known type of lifting lever not shown, since it forms no part of the present invention. An inward pull on link 51ᶜ will cause upward swinging of cutter bar 17 about a pivot 51ᵈ in well-known manner.

Member 43 also has a rearwardly extending arm 52, Fig. 1, in the present instance above push bar 49 and having pivotally connected at 53 a fork portion 54 or similar suitable support for a caster wheel 55. Returning to frame member 19, a supporting bracket 56 extends outwardly from member 19 and has pivoted at 57 a fork portion 58 or other suitable support for a caster wheel 59. Bracket 56 and fork 58 are preferably provided with interengaging detent portions at 59ª, Fig. 2, and a spring 59ᵇ tends to maintain the portions in engagement. This will prevent wheel 59 from turning too freely and wabbling or what is commonly known as "shimmying," but will not prevent castering of the wheel upon a definite change in direction of travel of the mower.

It will now be apparent that frame unit 11 will trail behind tractor 13 supported by wheels 55 and 59 thus propelling cutter bar 17 in the desired direction and attitude.

Latch means 60, as more particularly seen in Fig. 8, comprises a finger 61 pivoted at 62 to depending ears 63 on member 20 and pressed upwardly by a spring 64 compressed on a bolt 65 slidable in a bracket 66 extended from member 20. A nut 67 may be adjusted on bolt 65 to obtain the desired compression in spring 64. Bolt 65 has a head 67ª engaged beneath finger 61. Finger 61 has a detent portion 68 engageable with a roller or portion 69 on above mentioned member 43 and spring 64 may be stressed to such a point that the engagement between portions 68 and 69 serves the purpose of a positive connection during normal operation. In the event that cutter bar 17 encounters an obstruction as more particularly shown in Fig. 5, the force developed at detent 68 is sufficient to depress finger 61 whereupon portion 69 escapes from the finger and cutter bar 17 together with rear frame portion 16 and its attached parts swings rearwardly about hinge portion 44 as shown. Under these conditions, caster wheel 55 may swing sharply out of its normal course as indicated in dotted lines and no part of the mower structure is unduly stressed. Caster wheel 59 is not affected by this operation, but may swing when necessary to provide for turning movement of the tractor.

When it is desired to restore the parts to operative position, it is merely necessary to back the tractor, when frame section 16 will swing back about hinge 44 until roller portion 69 depresses finger 61. Under these conditions, member 43 is prevented from being forced upwardly by engagement beneath bracket 66. At the same time portion 45 takes a position embracing the rearward extremity of portion 18, thus restoring the parts to working position.

In tractor mowers of this general type as heretofore constructed, there has been difficulty in that the laterally extending cutter bar would move sidewise to an excessive extent, as related to the normal direction of travel when the tractor was turned sharply at the corners of the field. This would leave a portion of the material uncut in these regions. In the present instance owing to the lack of a connection at abutment 32, member 19 may lag somewhat at the beginning of the turning movement of the tractor as indicated in Fig. 3. This will permit cutter bar 17 to continue straight ahead for a time until the angle between member 21 and member 18 becomes great enough to cause frame unit 11 to follow tractor 13 in the turn. By this time, cutter bar 17 will have moved near enough to the corner that any backward or sidewise movement caused by the latter part of the turn will be insufficient to leave any uncut material. Chain 41 is preferably adjusted in length so that it will assist in turning after abutment 32 and T head 37 have separated a predetermined distance, or the chain may have sufficient slack so that it serves only as an emergency connection and in normal operation does not exert any pull on member 19. This adjustment will be determined by the particular conditions encountered.

It is to be noted that when the outfit is moved straight ahead, the mower in effect is carried on wheels 55 and 59 while tongue 25 constitutes a third point of support. Tractor 13 and mower 11 are therefore free to rock independently in planes transverse to the direction of progress so that cutter bar 17 can follow the contour of the ground without interference from the tractor.

In the present instance, above mentioned power take-off shaft 14 drives the cutting mechanism as follows.

A universal joint 70 is fixed on power take-off shaft 14 and drives through a sleeve 71 slidably engaged with a shaft 72 a universal joint 73. Joint 73 is fixed with a shaft 74 journaled in a bearing 75 mounted in the present instance on member 20. Shaft 74 has a pulley or the like 76 driving, through a belt 77 a pulley 78. Pulley 78 is mounted on a shaft 79 which carries a crank or fly wheel 80 with which is connected a pitman 81 of suitable or well-known construction. Pitman 81 is connected with a knife head 82 reciprocable in guides 83 and 84 and constituting part of a sickle generally designated as 85. The construction of sickles and cutter bars generally being well-known, it will not be necessary to describe this portion of the mechanism further.

As will be apparent, rotation of power take-off shaft 14 will cause rotation of shafts 74 and 79 and reciprocation of pitman 81 and sickle 85. The flexibility of universal joints 70 and 73 and the extensibility of sleeves 71 and shaft 72 will provide for universal movement of frame portion 11 relatively to tractor 13 without interferring with the drive through shaft 74 and the proportions of the parts are so chosen that this will be true under the conditions illustrated in Fig. 4. However, in the event of encountering an obstruction, as illustrated in Fig. 5, pulley 78 first moves nearer to pulley 76, thus loosening belt 77. Further movement of frame section 16 moves pulley 78 completely out of alignment with pulley 76, whereupon belt 77 is thrown off and the operation of sickle 85 is stopped. This is advantageous under these conditions. When the parts are restored to operative position it is a simple matter to replace belt 77, when the operation of the mower may be continued.

A standard 86, Fig. 6, is extended, in the present instance through portion 18, and may be retained in position to support frame section 15 when not in use and to facilitate the operation of connecting the tractor. A set screw 87 engages standard 86 for this purpose.

When the mower is being transported, the backward reaction of cutter bar 17 is lacking, and to supply a definite pressure against abutment 33 a spring 88, Fig. 1, anchored to an ear 89 on shank 38 has a hook 90 engageable in an ear 91 in the present instance on bar 21. While other expedients might be contemplated this has been found satisfactory in holding the parts in position during transport.

The above being a complete description of an illustrative embodiment of the invention, what is claimed as new and desired to be secured by Letters Patent of the United States is:

1. In a trail type mower for attachment to a tractor, the combination of a frame unit disposed rearwardly of said tractor and including a front section and a rear section hinged to each other for relative movement in a substantially horizontal plane, a cutter bar extending laterally from said rear section, wheeled supporting means for said rear section rearwardly of said cutter bar, wheeled supporting means for said front section, an overload release device connecting said front section and said rear section and preventing such hinging movement except in the event of excessive stresses in the parts, a shiftable abutment device between said front section and said tractor, and a universal pivotal connection connecting said front section to said tractor and disposed laterally between said abutment device and said cutter bar.

2. In a trail type mower for attachment to a tractor, a frame unit including a front section and a rear section hinged to each other for relative movement in a substantially horizontal plane, an overload release device connecting said front section and said rear section to prevent such hinging movement except in the event of excessive stress in the parts, a universal connection between the front section and the tractor, a cutter bar attached to said rear section, wheeled supporting means on said front section and wheeled supporting means on said rear section, and said hinge means having interengaging portions positioned to maintain said sections in predetermined relation to each other during hinging movement, such that said frame unit will ride stably on said universal connection and said wheeled supporting means in three-point suspension during at least a part of said hinging movement.

3. In a trail type mower for attachment to a tractor, the combination of a frame unit disposed rearwardly of said tractor, a cutter bar extending laterally of said frame unit, wheeled supporting means rearwardly of said cutter bar, a shiftable cushioned abutment device between said frame unit and said tractor, a universal pivotal connection connecting said frame unit to said tractor and disposed between said abutment device and said cutter bar whereby said tractor and said frame may separate at said abutment upon negotiation of a turn by said tractor, and a connection in the region of said abutment limiting the separating movement of the tractor from the frame.

4. In a trail type mower for attachment to a tractor, the combination of a frame unit disposed rearwardly of said tractor, a cutter bar extending laterally of said frame unit, wheeled supporting means rearwardly of said cutter bar, a cushioned abutment device between said frame unit and said tractor, and a universal pivotal connection connecting said frame unit to said tractor and disposed between said abutment device and said cutter bar.

5. In a trail type mower for attachment to a tractor, the combination of a frame unit disposed rearwardly of said tractor and including a front section and a rear section hinged to each other for relative movement in a substantially horizontal plane, a cutter bar extending laterally from said rear section, wheeled supporting means for said rear section rearwardly of said cutter bar, wheeled supporting means for said front section, a shiftable abutment device between said front section and said tractor including a body of yielding resilient material, and a universal pivotal connection connecting said front section to said tractor and disposed laterally between said abutment device and said cutter bar.

6. In a trail type mower for attachment to a tractor, the combination of a frame unit disposed rearwardly of said tractor, a cutter bar extending laterally of said frame unit, wheeled supporting means rearwardly of said cutter bar, a shiftable abutment device between said frame unit and said tractor, said abutment being adjustable to vary the spacing between said frame unit and said tractor in the region of said abutment, and a universal pivotal connection connecting said frame unit to said tractor and disposed between said abutment device and said cutter bar.

7. In a trail type mower for attachment to a tractor, the combination of a frame unit disposed rearwardly of said tractor, a cutter bar extending laterally of said frame unit, wheeled supporting means rearwardly of said cutter bar, a shiftable abutment device between said frame unit and said tractor, a universal pivotal connection connecting said frame unit to said tractor and disposed between said abutment device and said cutter bar whereby said tractor and said frame may separate at said abutment upon negotiation of a turn by said tractor, and a connection in the region of said abutment limiting the separating movement of the tractor from the frame.

8. In a trail type mower for attachment to a tractor, the combination of a frame unit disposed rearwardly of said tractor and including a front section and a rear section hinged to each other for relative movement in a substantially horizontal plane, a cutter bar extending laterally from said rear section, wheeled supporting means for said rear section rearwardly of said cutter bar, wheeled supporting means for said front section, a shiftable abutment device between said front section and said tractor, and a universal pivotal connection connecting said front section to said tractor and disposed laterally between said abutment device and said cutter bar.

9. In a trail type mower for attachment to a tractor, the combination of a frame unit disposed rearwardly of said tractor, a cutter bar extending laterally of said frame unit, wheeled supporting means rearwardly of said cutter bar, a shiftable abutment device between said frame unit and said tractor, and a universal pivotal connection connecting said frame unit to said tractor and disposed between said abutment device and said cutter bar.

10. In a trail type mower for attachment to a tractor, the combination of a frame unit disposed rearwardly of said tractor, a cutter bar extending laterally of said frame unit, wheeled supporting means rearwardly of said cutter bar, a shiftable abutment device between said frame unit and said tractor, a universal pivotal connection connecting said frame unit to said tractor when said mower is to be operated disposed between said abutment device and said cutter bar, and a stand adjustable into contact with the ground for supporting said frame unit in position to establish said universal pivotal connection upon approach of said tractor to said frame unit.

11. In a trail type mower for attachment to a tractor, a frame unit including a front section and a rear section hinged to each other for relative movement in a substantially horizontal plane, a universal connection between the front section and the tractor, a cutter bar attached to said rear section, wheeled supporting means on said front section and wheeled supporting means on said rear section, and said hinge means having interengaging portions so positioned as to maintain said sections in predetermined relation to each other during hinging movement, so that said frame unit will ride stably on said universal connection and said wheeled supporting means in three-point suspension during at least a part of said hinging movement.

12. In a trail type mower for attachment to a tractor, a frame unit including a front section and a rear section hinged to each other for relative movement in a substantially horizontal plane, means for attaching said front section to a tractor, a cutter bar attached to said rear section, wheeled supporting means on said front section, wheeled supporting means on said rear section, and an overload release connection between said front and rear sections preventing such hinging movement except in the event of an overload in the structure.

13. In a trail type mower, for attachment to a tractor having a power take-off, a frame unit including a front section and a rear section hinged to each other for relative movement in a substantially horizontal plane, means for attaching said front section to a tractor, a pulley supported from said front section in a plane transverse to the plane of said relative movement, connections for driving said pulley from said power take-off, a cutter bar attached to said rear section, a pulley supported from said rear section in operative relation to the first mentioned pulley, connections from the latter pulley for actuating said cutter bar, supporting means on said front section, supporting means on said rear section, a belt connecting said pulleys, and an overload release connection between said front and rear sections preventing such hinging movement except in the event of an overload in the structure, release of said overload release connection causing misalignment of said pulleys, throwing off of said belt and interruption of the drive to said cutter bar.

PAUL R. SCHROEPPEL.